(12) United States Patent
Harryson

(10) Patent No.: US 7,378,052 B2
(45) Date of Patent: May 27, 2008

(54) METHOD AND APPARATUS FOR PRODUCING FREE-FORM PRODUCTS

(75) Inventor: Urban Harryson, Kullavik (SE)

(73) Assignee: FCUBIC AB, Kullavik (SE)

( * ) Notice: Subject to any disclaimer, the term of this patent is extended or adjusted under 35 U.S.C. 154(b) by 110 days.

(21) Appl. No.: 10/320,004

(22) Filed: Dec. 16, 2002

(65) Prior Publication Data

US 2003/0133822 A1 Jul. 17, 2003

Related U.S. Application Data

(63) Continuation of application No. PCT/SE01/01320, filed on Jun. 14, 2001.

(30) Foreign Application Priority Data

Jun. 16, 2000 (SE) .................................. 0002299

(51) Int. Cl.
*B22F 7/02* (2006.01)

(52) U.S. Cl. ........................... 419/7; 419/35; 264/308; 425/375; 425/449

(58) Field of Classification Search .................. 419/6, 419/7, 5
See application file for complete search history.

(56) References Cited

U.S. PATENT DOCUMENTS

| 5,340,656 | A |   | 8/1994 | Sachs et al. |
|-----------|---|---|--------|--------------|
| 5,387,380 | A | * | 2/1995 | Cima et al. ................... 264/69 |
| 5,427,733 | A | * | 6/1995 | Benda et al. .................. 419/1 |
| 5,555,481 | A |   | 9/1996 | Rock et al. |
| 5,649,277 | A | * | 7/1997 | Greul et al. ................... 419/2 |
| 5,940,674 | A | * | 8/1999 | Sachs et al. ................... 419/2 |
| 6,589,471 | B1 | * | 7/2003 | Khoshnevis ................ 264/497 |
| 6,602,550 | B1 | * | 8/2003 | Grant et al. ................ 427/252 |

FOREIGN PATENT DOCUMENTS

DE 19723 892 C1 6/1997
WO WO/93/25336 12/1993

* cited by examiner

*Primary Examiner*—George P. Wyszomierski
(74) *Attorney, Agent, or Firm*—Gauthier & Connors LLP

(57) ABSTRACT

A method and apparatus for producing products from a powered base material, by means of so-called free form fabrication, wherein the powder granules are bound together into a solid product.

7 Claims, 4 Drawing Sheets

METHOD AND APPARATUS FOR PRODUCING FREE-FORM PRODUCTS

This is a continuation of copending application International Application PCT/SE01/01320 filed on Jun 14, 2001 and which designated the U.S.

The present invention relates to a method for manufacturing products from a powdered base material, by means of so-called free-form fabrication (FFF), wherein the powder granules are bound together into a solid product. The invention also relates to an apparatus for carrying out the method.

BACKGROUND OF THE INVENTION AND TECHNICAL PROBLEM

Free-form fabrication, abbreviated FFF, is a technique for manufacturing solid products which can have a complicated geometry, e.g. double-curved surfaces, and a complicated shape, e.g. cavities, without any other shaping than the utilisation of a CAD-system based on solids. In contrast to e.g. cutting manufacturing methods, the product is formed by means of depositing material in layers in the FFF-method.

There are a number of different FFF-methods, but only those which have certain parts in common with the present invention are discussed herein, e.g. U.S. Pat. No. 5,555,481 according to which a body is formed in layers from two different powder materials in accordance with a pattern controlled by a computer program. Each layer is compacted by means of a press device compressing the deposited powder layer. One of the powder materials forms the product itself whereas the other powder material constitutes a support for the prospective product during its fabrication. After the deposition in layers, those powder layers which are to form the product are bonded, e.g. by means of a heat treatment, while the powder in the support layers remains unaffected. The positioning of the two powder layers in geometrical patterns is very time-consuming, which makes the method commercially useless for mass-production.

WO 93/25336 discloses a process for deposition in layers of bodies from a powder, where selected portions of each layer which is to form the product are treated with thin jets of a binder which loosely binds the body together. The non-bonded powder material constitutes supporting material during the deposition in layers and is removed later. The loosely bonded body also can be subjected to a further processing in order to improve its durability.

Heat treatment or chemical reaction in layers, e.g. SLS or SLA, may be problematic. When performing e.g. laser sintering, the uppermost layer is heated intensely and simultaneously adheres to the preceding layer. When cooling down immediately afterwards, the material shrinks and shear stresses are created. These manifest themselves by means of the external corners of the component bending upwards.

OBJECT OF THE INVENTION AND SOLUTION TO THE PROBLEM

The object of the invention is to provide a method and an apparatus for free-form fabrication of articles at a high production rate.

DESCRIPTION OF THE DRAWINGS

In the following, the invention will be described in greater detail by means of an embodiment with reference to the attached drawings.

DESCRIPTION OF EMBODIMENTS

Description of the Method

Figure 1:
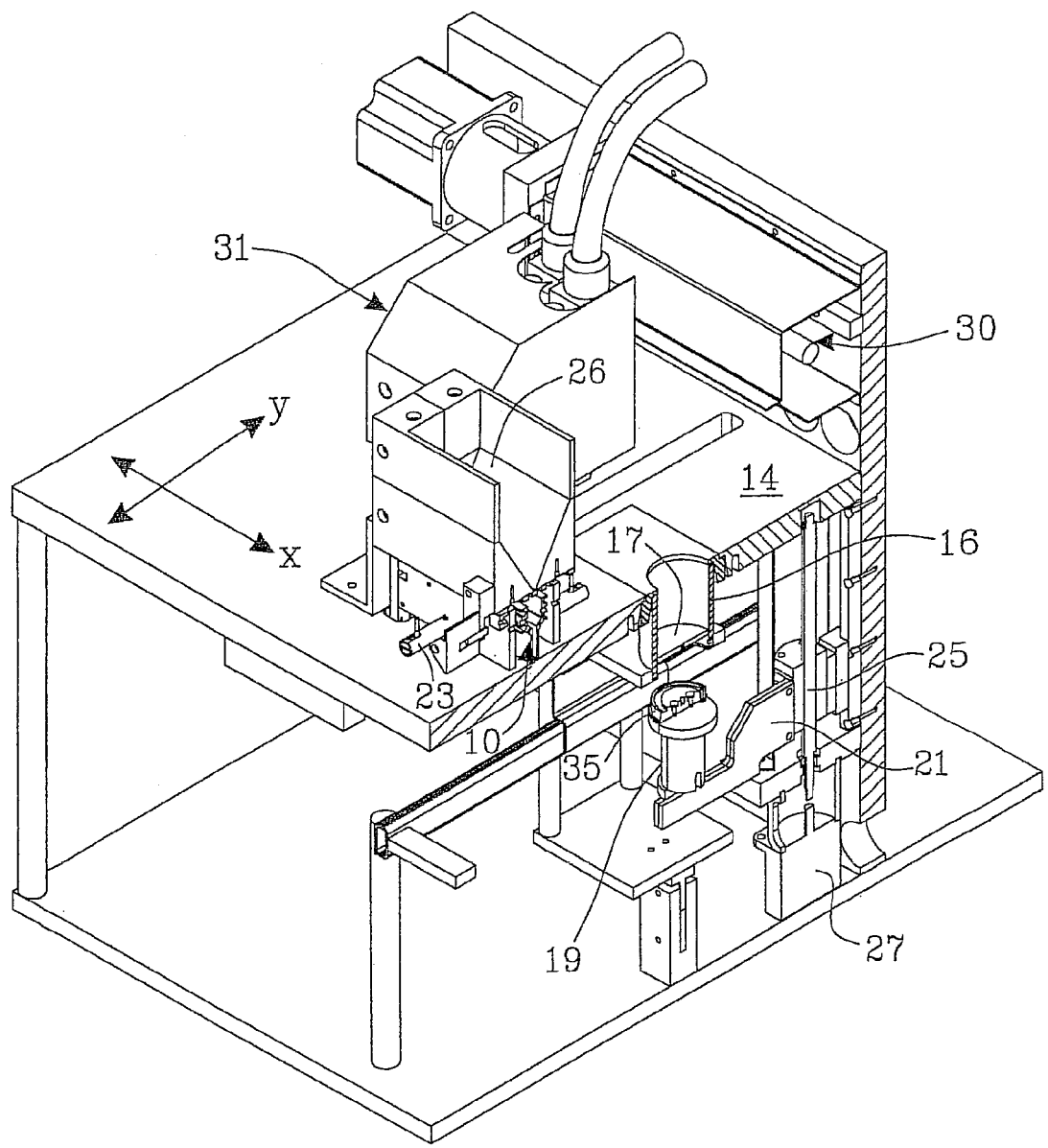
FIG. 1 shows a perspective, partial view of an apparatus for carrying out the method according to the invention.

The method is based on the use of a single powdered base material A, both for the product which is to be fabricated and for the portions which constitute a support during the fabrication. In order to prevent the supporting portions 36 from taking part in the unification in the bonding process where the powder granules are united, an additive B1 which inactivates the powder granules is added in layers, so that the granules will not be united within the treated areas. Alternatively or additionally, those portions of the base material A which are to form the product, the so-called product portions 37, can be treated with an activating additive B2, which has the function of uniting these powder granules in the bonding process, while the granules of the supporting portions remain substantially unaffected, i.e. loose. After the fabrication of the product, the supporting material still should be in such a state that the more or less solid product easily can be cleaned from the supporting material.

The major advantage of this production method is the high production rate, and that no undesired stresses are embedded into the product.

The powdered base material A is distributed across a limited area by means of a powder applicator, which can be constituted of the piston of a cylinder constituting the container in which the fabrication of the entire product takes place. In the production process, the piston is gradually lowered, so that a new layer can be deposited. The powder granules should be spherical and have a diameter between 10-120 µm in order to provide good flow and degree of packing. The material can be ceramic material, metals, or polymers. When producing e.g. casting moulds for metal casting, it is suitable to use ceramic materials. Approximately, the base material constitutes 90-98% of the total quantity. One of the reasons why the production rate becomes high is that the powder applicator is able to deposit the material rapidly, since only small quantities of activating or inactivating additive B have to be supplied.

As mentioned above, the task of additive B is to activate or inactivate the base material, depending on whether it is the product or supporting portions which are to be treated, the base material in question, and the choice of additives.

The activation of the product portions can take place by means of additive B:

1. reducing the melting or sintering temperature of the powder granules and/or the supplied additive having a small diameter. The surface energy is higher for small granules, which causes these to melt or sinter at a lower temperature;
2. reacting with the base material, so that a bonding takes place during the unification process. For metals, this can involve to reduce the melting or sintering temperature, so-called active sintering;
3. functioning as a catalyst, so that the base material reacts with itself.

The inactivation of the supporting portions can take place by means of additive B:

preventing the powder granules of the base material from being bound together in the unification process, e.g. preventing the base material from sintering;

preventing infiltration of the base material, in the portions where additive B has been applied.

Alternatively, both an activating and an inactivating additive can be used in the product portions and the supporting portions, respectively.

Additive B can be supplied in different ways. Since the process resembles printing onto paper, the techniques which have been developed for this purpose can be utilised. These can be:

inkjet, bubble-jet or similar methods, utilising the percolator effect;

different types of piezo-printers;

continuous pressure jet;

electrostatic methods of "laser printer" type. Thereby, particles are charged and thereafter deposited onto e.g. a transfer roll which subsequently rolls out the particles;

tonerjet.

If inkjet-printers are utilised for supplying additive B and this contains particles, these have to be dispersed. Many materials are possible to disperse, as long as the particles are sufficiently small. Silica is an example of a material which can be dispersed. Also materials which can be dissolved in liquid (e.g. water) can be utilised successfully. ADP (ammonium dihydrogen phosphate) and water glass, i.e. alkaline silicates (sodium, potassium and lithium silicates and others) are examples of such materials.

Regardless of the technique utilised for supplying additive B, a channel or a depositing position may be put out of operation. This results in the prospective mould or component becoming divided into two parts, since no activation takes place where additive B is missing. In order to avoid this problem and make the process more stable, the depositing device can be displaced transversely to the direction of motion after each layer. The displacement is small (corresponding to one or a few granule diameters) and is performed in accordance with a method ensuring that the mould or component does not loose strength even if several channels are put out of operation.

An instrument, which in the production process in a systematic way verifies that the depositing device for additive B functions satisfactorily, can be provided in order to guarantee moulds or articles of an adequate quality. Such an instrument can be a detector, which by means of light beams or the like checks the printer nozzles with respect to their droplet activity.

The next step in the production method is the unification process in which the product is created. The activation or inactivation by means of the additive takes place when all layers or all layers in a group have been deposited.

The activation is performed e.g. by means of supplying a gas or increasing the temperature. The advantages of doing this when all layers have been deposited are that:
1. the time per layer is reduced;
2. no internal stresses are built in;
3. the apparatus for depositing and layering is made available for continued production, since the unification process can be performed separately from the powder deposition and layering.

In case e.g. water glass in liquid form has been sprayed on, this can be precipitated by means of changing the pH. This can be done by means of a liquid or a gas, e.g. $CO_2$.

Furthermore, aluminium oxide can be bonded to a silicon oxide SOL[1] in a heating process. Inactivation can take place if a SOL of a ceramic material is sprayed onto a metal in order to prevent later sintering and infiltration with another metal.

[1] A SOL is a dispersed ceramic material, typically silicon oxide or aluminium oxide having a particle size between 5-200 nm.

An alternative method of activation or inactivation is to use chemical processes alone, wherein an additional agent is supplied, e.g. $CO_2$ which reduces the pH and thereby precipitates water glass or the particles included in a SOL. Alternatively, e.g. ammonia can be utilised.

After the unification of the powder granules, the product is cleaned. If the material consists of spherical granules, this can be done by means of lifting the component out of the container and blowing it clean. For materials which are more difficult to clean, other methods may be necessary, e.g. brushing. Possibly, the material which does not constitute component can be recycled.

Depending on the intended use for the product, it can be treated in an additional step. In case the manufacture of casting moulds for metal casting is concerned, the casting mould which is the fabricated product in this case can be infiltrated e.g. with water glass in order to increase the strength. Alternatively, a SOL of silicon oxide can be utilised in combination with a subsequent sintering in order to obtain a very durable casting mould and smooth surfaces. This method is also perfectly suitable when ceramic components, instead of casting moulds, are to be manufactured.

Description of the Apparatus

Figure 4:
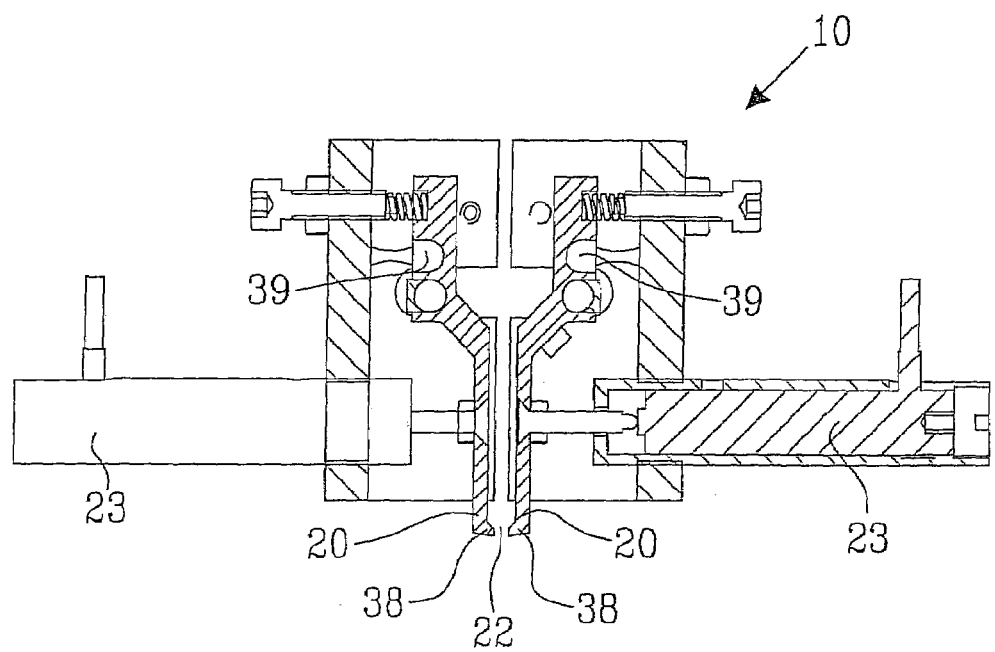
FIG. 4 shows a section through the powder applicator in magnified scale.

The apparatus shown in the drawings is a laboratory apparatus, but includes all the parts which are required for a large-scale production. The apparatus comprises a powder applicator 10, which is displaceable along a linear guide 12 across a table top 14 into which a production container 16, having an opening 18 located in the plane of the table top, is recessed. The powder applicator 10 sweeps across the opening 18 and deposits a certain powder quantity. The powder applicator consists of two oblong plates 20 (see FIG. 4), which form a gap 22 between themselves in which the powder pours down, and which rake the powder above the opening 18 of the container. The two plates are vibrated by means of a respective vibrator 23, which can be a piezo-cell, a moving coil (loudspeaker without paper cone), or the like. Suitably, the frequency is between 50-10000 Hz.

The bottom 17 of the production container 16 is constituted of a piston, displaceable within the container, the piston stem 19 of which can be detachably connected to the piston by means of a coupling device 35, e.g. a suction cup, which by means of a negative pressure can accomplish a rapid coupling, and thereby also a swift change of production container when the layering procedure has been completed. The opposite end of the piston stem 19 is attached to a bracket 21, which by means of a screw-nut mechanism 25 can be raised and lowered by means of a motor 27.

Figure 2:
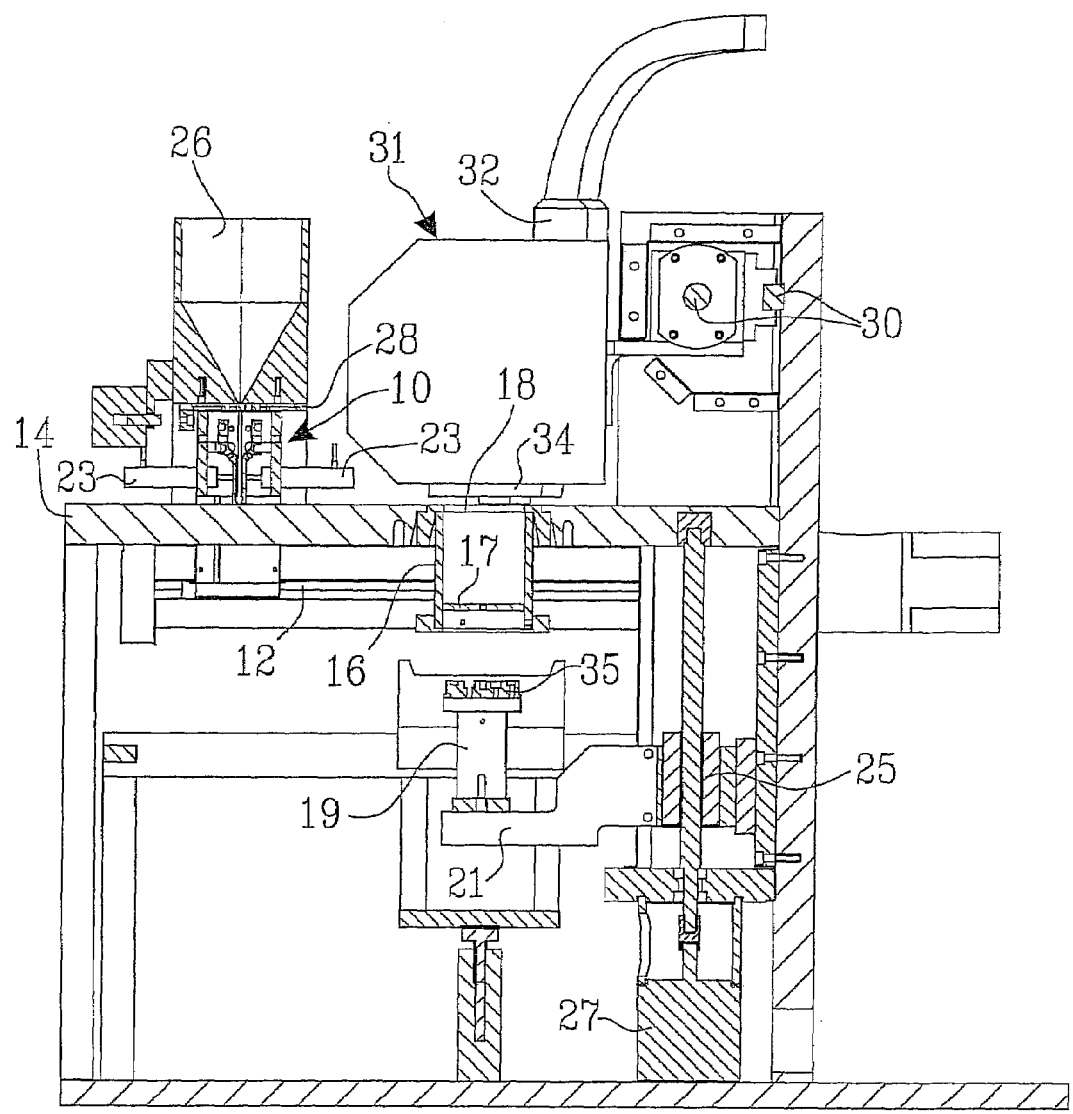
FIG. 2 shows the surface of a section of the apparatus according to FIG. 1.
Figure 3:
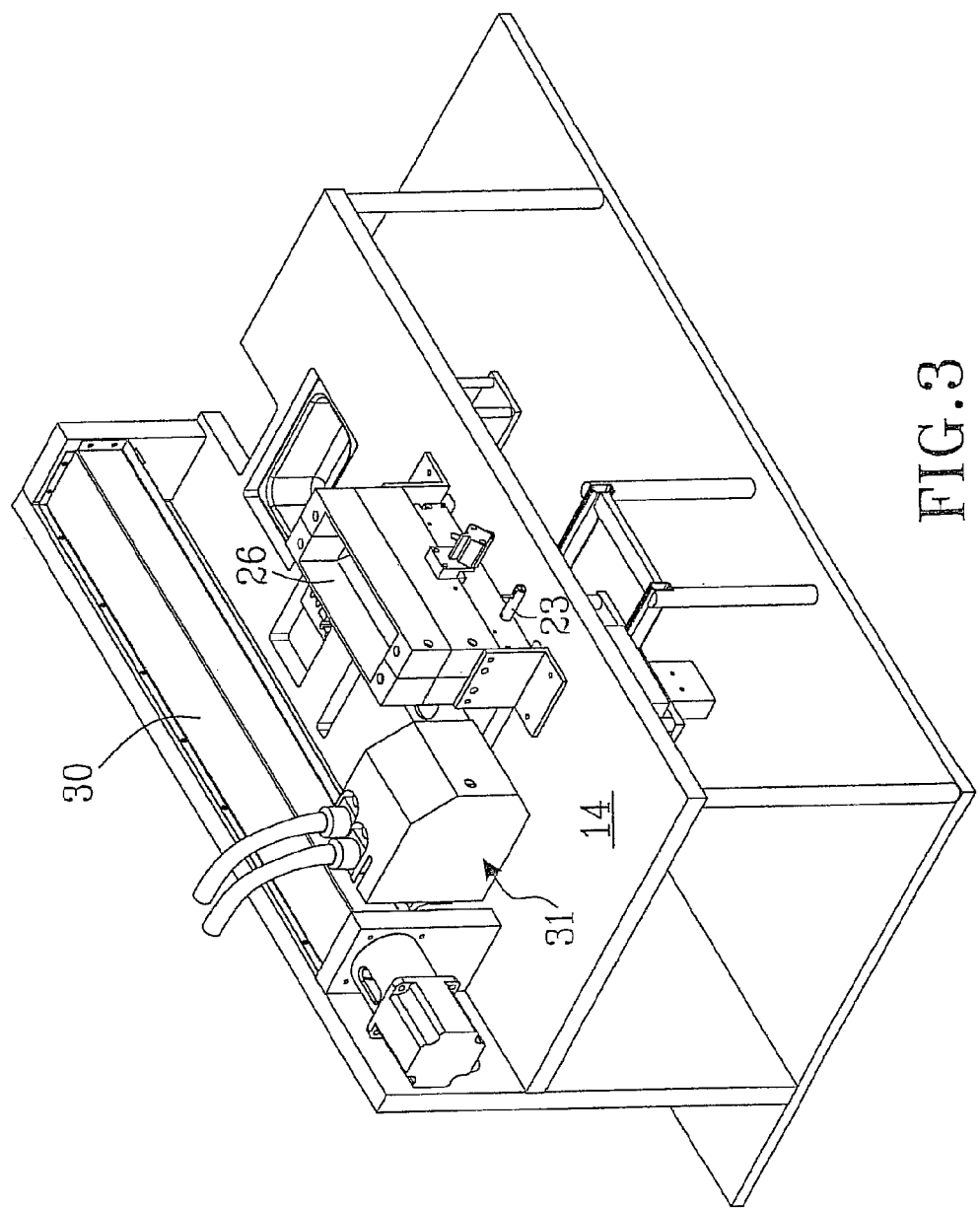
FIG. 3 shows a perspective view of the complete apparatus seen obliquely from above.

In order to reduce the overall weight, the powder applicator 10 only accommodates a minor quantity of powder A, corresponding to one or a few deposited layers 24. This reduces the weight and enables faster accelerations and a faster deposition to be performed. The level is detected by means of a distance meter based on sound or light. When necessary, the powder applicator is filled with fresh powder from a reservoir 26. In FIGS. 1-3, the powder applicator is shown when docked to the reservoir for possible refilling.

Conveniently, both the nozzle 20 of the powder applicator, having the shape of two vertical plates with a small discharge opening between the plates, and the walls of the reservoir 26, can be heated. In the reservoir 26, the powder is heated to approx. 100-150° C. in order to prevent moisture absorption which impairs the flow of the powder, and an even higher temperature prevails in the powder applicator. The drying of the powder is fast, since the powder is pre-heated. A slide valve 28 in the bottom of the reservoir is opened and a certain quantity of powder A is poured down into the applicator 10. This takes place when the level detector indicates that the powder level in the applicator is too low. The refilling is performed at the turning point in order not to reduce the production rate.

A second linear guide 30, along which a depositing device 31 can be displaced, is arranged perpendicularly to the direction of motion of the applicator 10. In the shown embodiment, the depositing device is equipped with a "printer" 32 of inkjet type or which performs electrostatic application of additive B for treatment of the powder layers. In case the printer 32 cannot cover the entire distance across the container opening 18, i.e. cover the entire area in one run, in addition to being displaceable along the linear guide 30 (the X-coordinate) it also can be displaceable in parallel to the direction of motion of the applicator 10 (the Y-coordinate).

When utilising printers of inkjet type, a relatively large liquid quantity, out of which only a minor portion constitutes active substance, is supplied. A larger quantity is water or solvent. A rapid drying process has to be accomplished in order to speed up the drying and prevent liquid from spreading into the powder by means of the capillary effect and cause poor outline contrast. By means of maintaining a high powder temperature in the reservoir and, above all in the applicator, the need for heating lamps, microwaves, etc. is eliminated. The powder temperature should be between 40-400° C., preferably between 90-150° C. In case the drying process is performed slowly, the subsequent layer(s) will prevent diffusion out from the bed.

In order to avoid that previously deposited powder, particularly such portions which are coated with additive B, get caught on the scraping edge of the plates 20, these edges are bevelled approximately 10°. In combination with the shaking movements from the vibrators 23 this will cause protruding granules to be pressed down into the powder bed instead of being pulled along. Possibly, the plates 20 could be vibrated also in a vertical direction. As a further alternative, with the purpose of pressing down possibly protruding granules, two rolls (not shown) which can be elevated or lowered can be installed, one on each side of the applicator. The roll is rotating so that no sliding occurs between powder and roll. The contact surface of the roll is right below the scraping edge on the leading side of the scraper. On the other side, the roll is elevated.

Depending of the type of additive, the active substances included, and the carrier fluids which are utilised, also the nozzles of the printers have to be adapted accordingly. Printers utilising piezo-based technique have the advantage that they are not worn out, something which can offer a considerably lower operational cost in comparison to bubble-jet. By means of providing the printers with a large number of nozzles, e.g. 5000, covering the entire printing width in one run, the production rate can be increased even further. Also the technical solution of arranging the printing direction of the depositing device 31 perpendicularly to the direction of motion of the powder applicator contributes to time savings, since the return movement of the depositing device can be utilised in an active way.

In order to avoid mechanical stresses in the material during the layering procedure, which may arise in the deposited volume, and in order to speed up the drying, the deposited volume is maintained at a raised temperature of about 150° C. by means of heating the sides of the container 16 and possibly its piston by means of heating elements (not shown).

Figure 5:
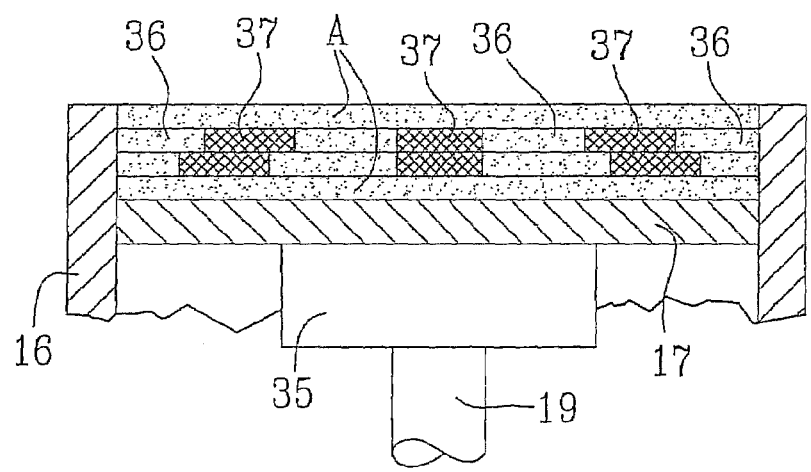
FIG. 5 shows a schematic view of a stage in the process of depositing the powder layers.

FIG. 5 shows a few of the first layers in the container 16, after the treatment of certain portions of the different layers with additive B. In a subsequent unification process, the material in the untreated portions 36 remains substantially unaffected or becomes only loosely bonded, i.e. it is not baked into a solid cake but may still have a loose or very porous nature which easily can be broken. In this example, the portions which are denoted with 37 are treated with an active additive B and are the portions which during the unification process, e.g. by means of a heat treatment, are sintered together into a more or less solid body.

Material Description

In the following, a number of material combinations intended for fabrication of e.g. ceramic casting moulds for metal casting will be described, but it is of course also possible to utilise the same methods for manufacturing other products from other materials. In this specific case, the casting mould is the product which is to be fabricated in accordance with the FFF-method.

Ceramic Material—ADP

The ceramic material is utilised as base material A. This can be zirconium sand or spherical aluminium oxide. These materials are the least expensive, and therefore the ones best suited. Other materials can be utilised. It is not necessary to utilise round granules, but these provide:

a better packing degree;

a smaller consumption of additives;

better flow properties, and thereby easier cleaning when non-activated material is to be poured out of the mould.

The suitable granule size is about 10-150 μm. Smaller granules should be avoided, since:

the capillary effect causes spreading of the additive, and results in an impaired contrast of the finished component;

smaller granules makes the air-removal more difficult when casting;

they reduce the activation effect, since smaller granules have a higher surface energy and sinter more easily at a lower temperature. As a result, the entire body may be bound together in the subsequent activation step;

dust formation when cleaning is increased, health-hazardous.

Larger granules should be avoided, since the layers otherwise will become too thick. These layers will be visible in the casting mould and on the component.

In experiments, it has been found that only minor quantities of additive in liquid form B2, e.g. applied by means of inkjet technique, have to been supplied in order to subsequently bind together a completely spherical powder. For ADP, when using zirconium sand, it has been found that only approx. 2% of the powder weight has to be supplied as activating liquid B2, including the additives required for printing the liquid by means of the inkjet method, in order to cause activation to take place. This corresponds to 0.45% ADP as dry solids. There are two reasons why this is possible:

1 Many contact sites are formed between the particles. The supplied liquid will become distributed between the particles. If the liquid has a beneficial wetting angle in relation to the base material, the particles are attracted to each other. If only a certain movement occurs between the last applied dry layer and previous layers, this results in the particles contacting each other the moment the activating agent is sprayed on. The forces acting between the granules are very large in comparison to the force of gravity. According to e.g. Randel German, the forces can be 10,000 times larger for particle sizes about 50 μm, 2 The activating agent is concentrated at the contact sites. When the activating liquid (the printing liquid) dries by means of evaporation, the activating agent is concentrated at the contact site. This results in a high concentration being obtained at the contact site. In the subsequent activation step, the reaction then can take place:
  at maximum force, since a high concentration of activating agent is available at a certain site;
  in the correct position, namely at the contact sites between the particles. In fact, this is where the entire porous structure, or skeleton, is bound together.

An activating additive B2 can be a solution of water (100 parts by weight), ADP=ammonium dihydrogen phosphate ($NH_4H_2PO_4$) (30 parts), 2-pyrollidone (10 parts), and iso-propanol (2 parts). Also other additives can be present in order to improve the printing quality and the working life of the nozzles. The active substance is ADP, remaining additives are intended to enable the liquid to be printed by means of conventional printheads. Other mixtures are required for other types of printheads.

Depending on the grain-size distribution of the base material and thickness of each deposited layer, each layer is coated one or several times with additive. The time between each layer should be long enough to allow the liquid to evaporate, e.g. between 1-5 seconds.

When the layering of the casting mould is completed in the container 16, it is removed and placed in an oven. In the oven, the article is heated to an activating temperature of up to 190° C. in order to melt ADP. If additional bonding is required, heating up to 850-880° C., and further up to 1045° C., can be performed.

The material combination ($Al_2O_3$—($NH_4$)$H_2PO_4$) is an example of a ceramic material. Other known material systems are e.g. $Al_2O_3$—$B_2O_3$; $SiO_2$—$B_2O_3$; $SiO_2$—$P_2O_5$; $SiO_2$—$B_2O_3$—$P_2O_5$. These systems generate different ceramic or vitreous materials at different temperatures. For more exact process conditions, a good picture can be obtained from the phase diagrams of the different systems, in which possible reactions and temperatures are shown.

When the product—in this case the casting mould—has been activated, it is removed from the oven and cleaned. Thereafter, the mould is ready for casting. If a stronger casting mould is desired, the cleaned mould can be sprayed with, or immersed into a silicate (water glass) having a low viscosity. This binder is utilised within the field of conventional sand casting as a binder. Thereafter, the silicate is precipitated by means of supplying $CO_2$, wherein the pH-value is reduced. The gas can penetrate the entire mould, since the mould is porous, and thereby a high strength can be obtained. Alternatively, ester curing can be utilised. As a further alternative, the mould can be reheated, so that drying and subsequently melting of the silicate occurs.

Another alternative is to utilise a silica sol. A sol having a low viscosity and a high silica content is preferred. The casting mould is sprayed with, or immersed into the sol. Thereafter, the mould is sintered at 900-1000° C. as a final step before casting.

Still another alternative is to immerse the mould into a mixture of ADP and water. After this the mould can be heated in order to increase the strength. The reactions are the same as in the above-described activating process.

Ceramic Material—Silicates (Water Glass)

When water glass is utilised as additive B, in principle most materials are useful as base material A, i.e. metals, ceramic materials and polymers. When using water glass, its ability to bind together other materials is utilised. This takes place by means of so-called gelation. The bonding action is created by means of allowing a water glass solution to gelate and cure by means of viscosity increase. This is accomplished by means of drying, or pH-influencing additives (curing agents). Water glasses (alkali silicates) are virtually colour- and odourless, relatively viscous liquids. When their chemical nature is concerned, they are solutions of alkali silicates in water having the simplified formula: $Na_2O$—and $K_2O$-$mSiO_2$-$nH_2O$.

An alkali silicate is characterised chemically by means of the ratios $SiO2/Na2O$ and $SiO2/K_2O$, also called "the ratio" and the "water content". The water content influences the density and viscosity of the silicate.

Sodium silicates can be cured in order to obtain mechanical properties suited for e.g. casting purposes. Primarily, curing of bonds in water glass, takes place by means of precipitation of silicic acid gel when carbon dioxide is absorbed into the binder phase. As a result of carbonic acid reactions in the alkaline water solution and polymerisation of silicate ions, the gelation of sodium silicate with carbon dioxide is complex. The curing takes place by means of the carbon dioxide absorption and its equilibriums can be described with the following reactions:

$$CO_2(g) + H_2O \rightarrow H_2CO_3$$

where $H_2CO_3 = H_2CO_3 + CO_2$ are dissolved in the water solution.

$$H_2CO_3 \rightarrow HCO_3^{1-} + H(+) \text{ och } HCO_3^{-1} \rightarrow CO_3^{2-} + H(+).$$

In a sodium-containing solution, sodium carbonates can be precipitated at high carbonate contents.

$$2Na(+) + H_2CO_3 \rightarrow Na_2CO_3 \cdot nH_2O(s) + 2H(+)$$

Also sodium bicarbonate may be formed.

$$Na(+) + H_2CO_3 \rightarrow NaHCO_3(s) + H(+)$$

Since the carbon dioxide gassing only cures the solution in an indirect way, the silicon kinetics decides the gelation rate and thereby the strength formation. Therefore, to a great extent, the mobility of the silicon ions (the viscosity of the solution) decides how rapidly they can form a durable network. From the reaction formulae it can be concluded that the carbon dioxide pressure outside the solution influences the reaction equilibrium. A low partial pressure of carbon dioxide reduces the risk of precipitation of sodium carbonate, something which indicates "excessive gassing".

Today, normally a binder having a low ratio $SiO_2/Na_2O$ is utilised in order to reduce the risk of "excessive gassing". It can be proven that large carbon dioxide quantities are required in order to precipitate all silicon, even if a larger ratio were to be selected. Therefore, in practice, the precipitation of silicon is incomplete, which also explains why the mechanical properties are inferior e.g. to curing by means of drying.

When producing free-form fabricated components, the water glass is sprayed onto the portions where the base material later is to be bound together. Since the silicate can be precipitated by means of decreasing the alkali content, a complete drying is not required. This means that a lower temperature can be maintained. When the last layer has been formed, the deposited volume is lifted out. Thereafter, the article is cleaned and is ready for casting. Post-treatment in accordance with the previous description can be performed in case as stronger mould is desired.

Ceramic Material—Sols

Sols have been pumped by means of conventional printheads with a certain success. Both metals and ceramic materials can constitute base material when generating the pattern. This is possible since the sols only constitute a binder for those particles which are present within the generated area, and do not react with these at the prevailing temperatures. However, when casting moulds of ceramic materials are concerned, a consolidation takes place before use at such temperatures that a reaction between silica and e.g. zirconium or aluminium takes place. The finished material will have constituents which are called fireclay, molochtite, mullite, etc.

Sols can be characterised as colloidal dispersions of silica particles in water. The expression "colloidal" means "stable dispersion of individual particles or agglomerates". The particles ($SiO_2$) are amorphous (non-crystalline) and have a size between 5-150 nm. By means of making the mixture weakly alkaline (pH=9.5-10), a stable suspension can be obtained. The miscibility of the amorphous particles has been adapted to many purposes. The sols can contain as much as 30-50 weight-% of silica.

When gelated silica is gradually heated, initially water is evaporated from pores in the material. Also a certain dehydration takes place, wherein the gel structure changes. Heating of silica up to 300 degrees is often denominated "activation". From 150 up to 600°, silica maintains its active surface, which has been created by the activation, however will bridges be formed between adjacent particles (increase of coalescence factor). When the temperature is raised further, the active surface starts to decrease, the gel shrinks and the consolidation of the material proceeds. However, the structure of silica remains amorphous even up to 1000-1200°. The temperature is dependent on the presence of other materials, such as e.g. Na, the ambient pressure, and also the pore size of the gel. Thereafter, the transformation into crystalline $SiO_2$ (glass) takes place in rapid process, since the amorphous structure is not stable within the temperature range.

Metals—Sols (Alt. Dispersions)

As described in the following, base materials of metal can be utilised in the FFF-method in a similar way as base materials of ceramic materials. Additive B which is utilised for the pattern generation will here have an opposite action in comparison to the foregoing description of the ceramic material—sol system. In this case, the pattern-generated area will be the area which by means of the process is to be removed from the finished FFF-product. In this process, the geometry of the directly-fabricated product and the pattern-generated geometry have to be described as inversions of each other.

When a ceramic sol or dispersion is applied in a pattern on a layer of metal powder, the ceramic material in the pattern will prevent the powder granules within the pattern from consolidating in such a way that any significant mechanical properties are obtained. The final properties depend on how big the proportion of present ceramic particles is. Also the subsequent infiltration of the powder body can be influenced by the ceramic particles amongst the metal powder particles.

Primarily, the consolidation mechanism which is prevented within pattern-generated areas is constituted of diffusion processes. In normal consolidation, the initial consolidation takes place by means of so-called surface diffusion. A material redistribution takes place in the vicinity of a contact site between two metal granules, so that the total surface of the granules is reduced. This results in the creation of a so-called "neck" between the two granules.

When a particle is present between the granules, it can separate the metal particles completely and in this way make the surface diffusion more difficult. The particle can also be situated in the vicinity of a contact site between two metal granules and still make the diffusion more difficult. The latter can take place because the particle disturbs the driving force for the diffusion, so that e.g. a new particle is formed by means of the surface diffusion moving material from the original metals granules to the particle, instead of redistributing material between the metal granules.

When foreign particles are present when infiltrating melted phase between the metal granules, interactions take place between the melt and the particles. Those particles which are locked, as a result of the precedent sintering, force the melt front to stop or slow down. This occurs by means of the melt curving around the particles, and thereby increasing its energy. In this way, the particles, which have been selected so that they have a high wetting angle in relation to the melt, forces the melt front to take another way, which will be those areas which have not been pattern-generated.

The influence of foreign particles on the consolidation of powder materials is complex, but in any case it is well known that a high purity of included materials is a basic prerequisite for enabling a complete consolidation to take place when compacting powder materials.

Composite of Metal/Ceramic Material

A mixture of metal and ceramic particles, so-called Cermets, can be utilised to constitute base material A. The pattern-generating liquid B, which is printed onto successive layers of the Cermets-mixture, has a bonding effect on the particles. This means that the pattern-generation can be performed in the geometry which is to be maintained after drying and sintering.

Because both metal and ceramic substance are present, sintering/compaction of Cermets will not take place with the same mechanisms as when sintering homogenous materials. Cermets are often compacted by means of an externally applied isostatic pressure (HIP). The compaction of the material is performed at a higher temperature than when compacting metal. The materials which are included in Cermets can be e.g. steels with a low or high carbon content (APM 2238, APM 2311, APM 2389, and also high speed steel) and the ceramic particles oxides, carbides and borides ($Al_2O_3$, TiN, $Cr_3C_2$ and CrB). The selection of the metal/ceramic material combination is critical to the applications where it is to be utilised.

When utilising Cermets, ADP, sols (silicon sol) and water glass should all function as binding materials, since the binder only embeds the particles in the pattern-generating areas. The pattern-generating areas can be bonded by means of processing at a relatively low temperature, so that inherent moisture and liquid is expelled. In order to obtain useful properties, the body/component should be subjected to a sintering cycle having an adapted temperature and tine, wherein the printing liquid B is included as a component in the material Metal—Dispersed Activating Metal, Carbon Carbon is a known material which reduces the melting temperature of iron (Fe), see the iron-carbon diagram.

Amongst the Fe-powder methods, mechanical admixture of carbon (so-called mechanical alloying) is a common method of increasing the ability of a powder quantity to consolidate in predetermined conditions.

If carbon is applied in a certain pattern, material which will sinter more easily than surrounding material is obtained within these areas. By means of an appropriate selection of sintering temperature, pattern-generated areas can be separated from surrounding material.

Other substances which in different ways influence the sintering tendency of iron and iron alloys are boron (B), boron oxide ($B_2O_3$), sodium chloride (NaCl), iron phosphate ($Fe_3P$), phosphorus (P), ammonium chloride (NHxCl), (NiB), silicon (Si), titanium (Ti), ammonium phosphate ($NH(PO_3)$) and ($TiH_2$). Boron and phosphorus reduce the melting temperature (eutecticum), and thereby facilitates diffusion processes in melted phase.

LIST OF REFERENCE NUMERALS

A base material
B additive
10 powder applicator
12 first linear guide
14 table top
16 production container
17 bottom/piston
18 container opening
19 piston stem
20 gap nozzle/plates
21 bracket
22 gap
23 vibrator
24 layer
25 screw-nut mechanism
26 reservoir
27 motor
28 shutter
30 second linear guide
31 depositing device
32 printer
34 printhead
35 coupling device
36 supporting portion
37 product-forming portion
38 bevelling
39 heating element

The invention claimed is:

1. A method of producing products from a powdered base material, by means of free form fabrication, wherein the powder granules are bound together into a solid product in accordance with the following steps:

a. deposition in layers of the powder in a container having a bottom which can be elevated and lowered;
   b. treatment in layers of selected portions of the powder in a predetermined pattern with at least one additive, which divides said layers into supporting portions and product portions:
      a first additive being of a type which in a subsequent unification process inactivates supporting portions, so that a binding together of the granules substantially is prevented or reduced in such a unification process and/or a second additive being of a type, which in a subsequent unification process, activates product portions, so that a binding together of the granules takes place in such a unification process;
   c. repeated deposition in layers until all layers or all layers in a group have been deposited and treated in accordance with step b, said base material of the product portions still being unbound;
   d. the layered material in the container being subjected to a unification process, wherein the base material of the product portions is unified into a solid body; and
   e. removing the product manufactured in this way from the container and cleaning the product from the base material of the supporting portions.

2. A method according to claim 1, wherein,
   a ceramic material in a powdered state and having good flow and packing degree, is utilized as base material.

3. A method according to claim 1,
   wherein, the base material consists substantially of spherical granules, having a particle size between 10-150 μm and that said second additive in liquid state in total constitutes 0.5-7 weight-% of the base material weight.

4. A method according to claim 1, wherein, the subsequent unification process is constituted of a heat treatment.

5. A method according to claim 4,
   wherein, said base material comprises a metal powder, and said first additive comprises polymers, water glass, wax, a sol of silica or a carbon, sintering-promoting substance.

6. A method according to claim 4, wherein said base material comprises ceramic materials or Cermets, and said first additive comprises polymers, ammonium phosphate compounds, aluminium phosphate compounds, water glass, wax, or a silica sol.

7. A method according to claim 1, wherein polymers are utilized as base material, and water glass, wax, or polymers as a first additive.

* * * * *